US 8,151,059 B2

(12) United States Patent
Sistla (10) Patent No.: US 8,151,059 B2
(45) Date of Patent: Apr. 3, 2012

(54) CONFLICT DETECTION AND RESOLUTION IN A MULTI CORE-CACHE DOMAIN FOR A CHIP MULTI-PROCESSOR EMPLOYING SCALABILITY AGENT ARCHITECTURE

(75) Inventor: Krishnakanth Sistla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 11/606,347

(22) Filed: Nov. 29, 2006

(65) Prior Publication Data

US 2008/0126707 A1    May 29, 2008

(51) Int. Cl.
    *G06F 12/00*    (2006.01)
(52) U.S. Cl. .. 711/141; 711/130; 711/210; 711/E12.023
(58) Field of Classification Search ................. 711/141, 711/210
    See application file for complete search history.

(56) References Cited

U.S. PATENT DOCUMENTS

| | | | | |
|---|---|---|---|---|
| 5,432,918 | A * | 7/1995 | Stamm | 711/156 |
| 5,809,536 | A | 9/1998 | Young et al. | |
| 5,870,616 | A | 2/1999 | Loper et al. | |
| 5,875,472 | A * | 2/1999 | Bauman et al. | 711/150 |
| 5,893,151 | A * | 4/1999 | Merchant | 711/140 |
| 6,009,488 | A | 12/1999 | Kavipurapu | |
| 6,038,673 | A | 3/2000 | Benn et al. | |
| 6,327,606 | B1 | 12/2001 | Chidambaran | |
| 6,801,984 | B2 | 10/2004 | Arimilli et al. | |
| 6,804,761 | B1 | 10/2004 | Chen et al. | |
| 6,959,358 | B2 * | 10/2005 | Regev et al. | 711/108 |
| 7,007,176 | B2 | 2/2006 | Goodfellow et al. | |
| 7,043,650 | B2 | 5/2006 | Bresniker | |
| 7,126,970 | B2 * | 10/2006 | Zboril | 370/535 |
| 7,249,381 | B2 | 7/2007 | Telesco | |
| 7,325,050 | B2 | 1/2008 | O'Cpnnor et al. | |
| 7,409,504 | B2 | 8/2008 | Rajamony et al. | |
| 7,644,293 | B2 | 1/2010 | Sistla et al. | |
| 7,769,956 | B2 * | 8/2010 | Tsien | 711/141 |
| 7,827,425 | B2 | 11/2010 | Hutsell et al. | |
| 2002/0178329 | A1 * | 11/2002 | Chaudhry et al. | 711/122 |
| 2003/0055969 | A1 | 3/2003 | Begun et al. | |
| 2003/0084359 | A1 | 5/2003 | Bresniker et al. | |
| 2005/0177344 | A1 | 8/2005 | Khaleel | |
| 2005/0262505 | A1 | 11/2005 | Esfahany et al. | |
| 2006/0149885 | A1 | 7/2006 | Sistla | |
| 2007/0055826 | A1 * | 3/2007 | Morton et al. | 711/141 |
| 2007/0079072 | A1 | 4/2007 | Collier et al. | |
| 2007/0233932 | A1 | 10/2007 | Collier et al. | |
| 2008/0002603 | A1 | 1/2008 | Hutsell | |

(Continued)

OTHER PUBLICATIONS

Notice of Allowance for U.S. Appl. No. 11/479,438, mailed Aug. 20, 2009.

(Continued)

*Primary Examiner* — Reginald Bragdon
*Assistant Examiner* — Hamdy S Ahmed
(74) *Attorney, Agent, or Firm* — Blakely, Sokoloff, Taylor & Zafman LLP (57) ABSTRACT

According to one embodiment of the invention, a processor comprises a memory, a plurality of processor cores in communication with the cache memory and a scalability agent unit. The scalability agent unit is adapted to control conflict detection and resolution of accesses to the memory. The scalability agent unit receives control information concerning transactions involving the memory without receiving data for the transactions.

12 Claims, 9 Drawing Sheets

U.S. PATENT DOCUMENTS

| | | |
|---|---|---|
| 2008/0005596 A1 | 1/2008 | Sistla |
| 2008/0126707 A1 | 5/2008 | Sistla |
| 2008/0126750 A1 | 5/2008 | Sistla |

OTHER PUBLICATIONS

Office Action for U.S. Appl. No. 11/479,009, mailed Jun. 23, 2009.
Office Action for U.S. Appl. No. 11/605,639, mailed Apr. 2, 2009.
Office Action for U.S. Appl. No. 11/479,438, mailed Feb. 20, 2009.
International Search Report and Written Opinion for International Application No. PCT/US2007/072294, mailed Oct. 30, 2007.
HyperTransport Link Specification, Revision 2.00b, Apr. 27, 2005.
Office Action from U.S. Appl. No. 11/605,636, mailed Apr. 2, 2009, 12 pages.
Final Office Action from U.S. Appl. No. 11/605,636, mailed Apr. 22, 2010, 20 pages.
Notice of Allowance from U.S. Appl. No. 11/605,636, mailed Feb. 9, 2011, 11 pages.

* cited by examiner

|  | RdClass | WbClass | SnpClass |
|---|---|---|---|
| RdClass | X 410 | X 420 | X 430 |
| WbClass | X 420 | 405 | X 440 |
| SnpClass | X 430 | X 440 | X 450 |

FIG. 6

| Conflict Name | Ordering Info |
|---|---|
| Rd-Rd Conflict | Order is irrelevant since the conflict is symmetric |
| Rd-Wb Conflict 500 | Rd is allocated first |
| Wb-Rd Conflict 505 | Wb is allocated first |
| Rd-Snp Conflict 510 | Rd is allocated first |
| Snp-Rd Conflict 515 | Snp is allocated first |
| Wb-Snp Conflict 520 | Wb is allocated first |
| Snp-Wb Conflict 525 | Snp is allocated first |
| Snp-Snp Conflict | First incoming Snp is allocated first |

CONFLICT DETECTION AND RESOLUTION IN A MULTI CORE-CACHE DOMAIN FOR A CHIP MULTI-PROCESSOR EMPLOYING SCALABILITY AGENT ARCHITECTURE

FIELD

Embodiments of the invention relate to the field of integrated circuits, and according to one embodiment of the invention, a system and method for handling conflicting transactions by scalability agent architecture within a Chip Multi-Processor (CMP) processor.

GENERAL BACKGROUND

Microprocessors generally include a variety of logic circuits fabricated on a single semiconductor integrated circuit (IC). These logic circuits typically include a processor core, memory, and other components. More and more high-end processors are now including more than one processor core on the same IC. For instance, multi-core processors feature architectures that implement multiple processor cores within a single IC.

Increased silicon efficiencies are now providing new opportunities for adding additional functionality into the processor silicon. As an example, applications are taking advantage of increased multi-threading capabilities realized from an increased number of processing cores in the same processor. Hence, it is becoming important to develop a conflict detection and resolution mechanism in order to detect and resolve a growing number of true address conflicts.

BRIEF DESCRIPTION OF THE DRAWINGS

The invention may best be understood by referring to the following description and accompanying drawings that are used to illustrate embodiments of the invention.

DETAILED DESCRIPTION

Herein, certain embodiments of the invention relate to a system and method for handling conflict detection and resolution with a CSI domain. A uniform technique for detecting the conflicts and commencing appropriate resolution flows is described in detail. Based on this uniform technique, the complexity of the conflict detection and resolution mechanism has been reduced in order to minimize the impact to system performance when handling a large number of in-flight transactions.

Herein, a conflict analysis describing the possible conflict types and conflict resolutions is provided. According to one embodiment of the invention, conflicts are resolved based on the order of entry into a scalability agent (described below) and there is only a single point of entry into the conflict detection logic of the scalability agent. Hence, the scalability agent is adapted to resolve conflicts between core-cache clusters regardless of the number of core-cache clusters or cores in the multi-core processor. This conflict detection may be performed by a single content address matching (CAM) unit.

In addition, the scalability agent does not receive data. In other words, this distributed conflict resolution mechanism does not require data forwarding because it is designed so that data is not staged within the scalability agent. Conflicts are handled in advance through the transmission of data between core-cache clusters. The scalability agent receives signals concerning the handling of this data. This reduces costs and reduces latency of transmissions between on-die caching agents.

In the following description, certain terminology is used to describe features of the invention. For example, the term "core-cache cluster" is generally considered to be a modular unit that comprises one or more cores and a shared cache. Core-cache clusters are used as building blocks for a scalable, multi-core processor such as a Chip Multi-Processor (CMP). For instance, several core-cache clusters may be joined together in accordance with a scalability agent protocol as described below.

A "scalability agent" is hardware and/or software that manages the flow of outgoing and incoming transactions into a socket associated with the core-cache cluster and supports the scalability agent protocol described above. According to one embodiment of the invention, the scalability agent (i) aggregates core-cache clusters to appear as one caching agent, (ii) handles local coherence between core-cache clusters on the same integrated circuit (IC), and (iii) support scalability so that the operations of a core-cache cluster are not significantly effected if other core-cache clusters are added.

A "transaction" is generally defined as information transmitted, received or exchanged between devices. For instance, a message, namely a sequence of bits, may form part of or the entire transaction. Furthermore, the term "logic unit" constitutes hardware and/or software and the term "interconnect" is generally defined as an information-carrying pathway for messages, where a message may be broadly construed as information placed in a predetermined format. This interconnect may be established using any communication medium such as a wired physical medium (e.g., a bus, one or more electrical wires, trace, cable, etc.) or a wireless medium (e.g., air in combination with wireless signaling technology).

According to Common System Interconnect (CSI) operability, a "home agent" is generally defined as a device that provides resources for a caching agent to access memory and, based on requests from the caching agents, can resolve conflicts, maintain ordering and the like. A "caching agent" is generally defined as primarily a cache controller that is adapted to route memory requests to the home agent.

I. System Architecture

Figure 1:
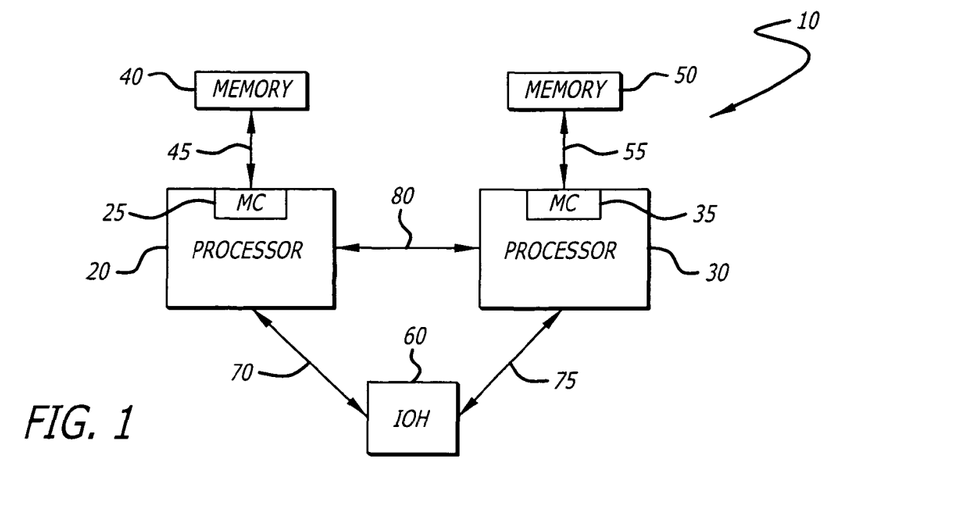
FIG. 1 is an exemplary block diagram of a data processing system implemented with one or more multi-core processors.

Referring now to FIG. 1, an exemplary block diagram of a data processing system 10 implemented with one or more multi-core processors. As shown, two multi-core processors are implemented within data processing system 10, which operates as a desktop or mobile computer, a server, a set-top box, personal digital assistant (PDA), alphanumeric pager, cellular telephone, video console or any other device featuring multi-core processors. These devices may include an input device controlled by a user (e.g., keyboard, keypad, mouse, hand-held controller, etc.).

Herein, according to one embodiment of the invention, system 10 comprises a pair of multi-core processors such as a first processor 20 and a second processor 30 for example. Each processor 20 and 30 includes a memory controller (MC) 25 and 35 to enable direct communications with a corresponding memory 40 and 50 via interconnects 45 and 55, respectively. Moreover, the memories 40 and 50 may be independent memories or portions of the same shared memory. According to one example, the memories may be dynamic random access memory (DRAM).

As specifically shown in FIG. 1, processors 20 and 30 are coupled to an input/output hub (IOH) 60 via point-to-point interconnects 70 and 75, respectively. IOH 60 provides connectivity between processors 20 and 30 and input/output (I/O) devices implemented within system 10. In addition, processors 20 and 30 are coupled to each other via a point-to-point system interconnect 80. According to one embodiment of the invention, these point-to-point interconnects 70, 75, 80 may be adapted to operate in accordance with "Common System Interconnect" (CSI) specification being developed by Intel Corporation of Santa Clara, Calif.

Figure 2:
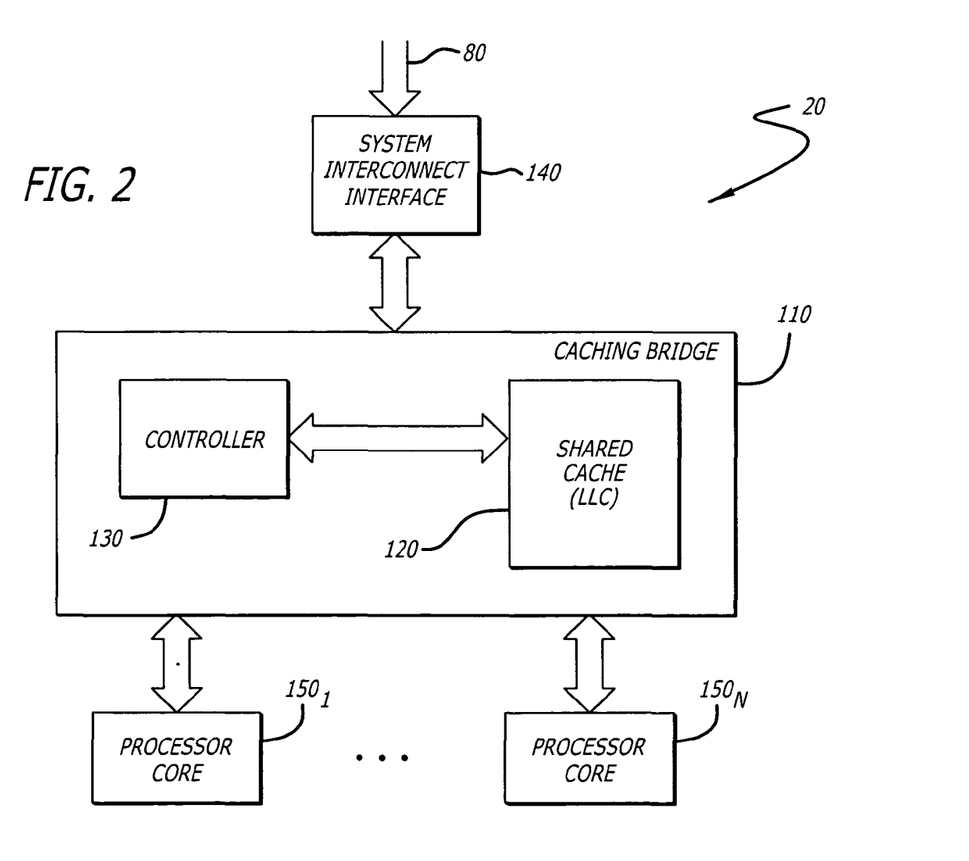
FIG. 2 is a first exemplary block diagram of a multi-core processor with a caching bridge configuration.

Referring now to FIG. 2, a first exemplary block diagram of multi-core processor 20 with a caching bridge configuration is shown. Herein, as shown, multi-core processor 20 comprises a caching bridge 110 that includes a shared cache 120 (identified as a "last level cache" or "LLC") and a centralized controller 130. Caching bridge 110 enables communications between (i) external components coupled to system interconnect (e.g., interconnect 80 of FIG. 1) via a system interconnect interface 140 that provides appropriate signal routing, (ii) shared cache 120 and (iii) a plurality of cores $150_1$-$150_N$ (N>1) in multi-core processor 20. Caching bridge 110 is responsible for maintaining coherency of cache lines present in shared cache 120.

While the caching bridge configuration of FIG. 2 provides one type of multi-core processor architecture, there are other architectures that are more scalable. For instance, multi-core processors with the caching bridge architecture generally feature four (4) or less cores in order to avoid any potential degradation in system performance. However, more than four cores can be deployed. Thus, multi-core processor 20 of FIG. 2 may be a desired architecture for certain core-cache clusters.

Figure 3:
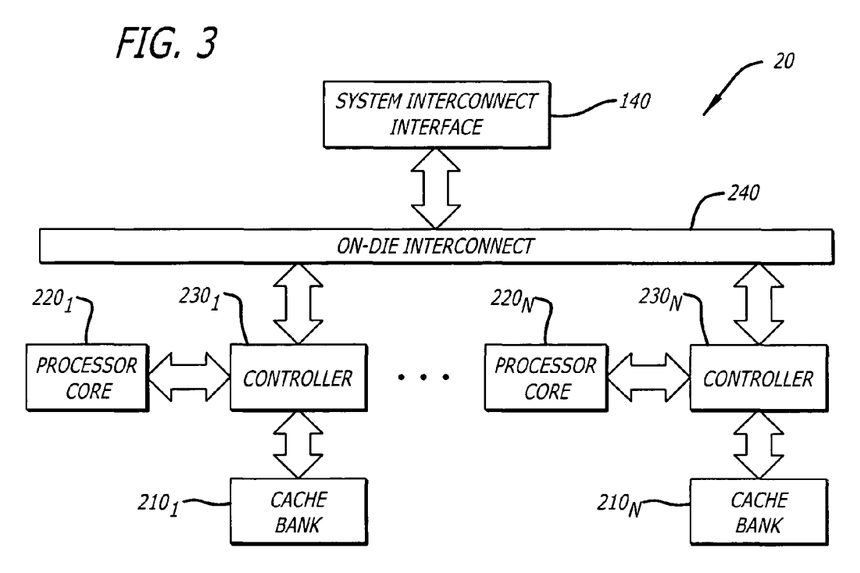
FIG. 3 is an exemplary block diagram of a multi-core processor having a distributed shared cache configuration.

Referring to FIG. 3, an exemplary block diagram of multi-core processor 20 having a distributed shared cache configuration is shown. As shown, shared caches $210_1$-$210_N$ are distributed among the multiple cores $220_1$-$220_N$. External to and associated with cores $220_1$-$220_N$ and coupled to an on-die interconnect 240, each controller $230_1$-$230_N$ is responsible for maintaining coherency of shared caches $210_1$-$210_N$, respectively. On-die interconnect 240 is high-speed and scalable to ensure that distributed shared caches accesses have a low latency since on-die interconnect 240 lies in the critical path.

Figure 4:
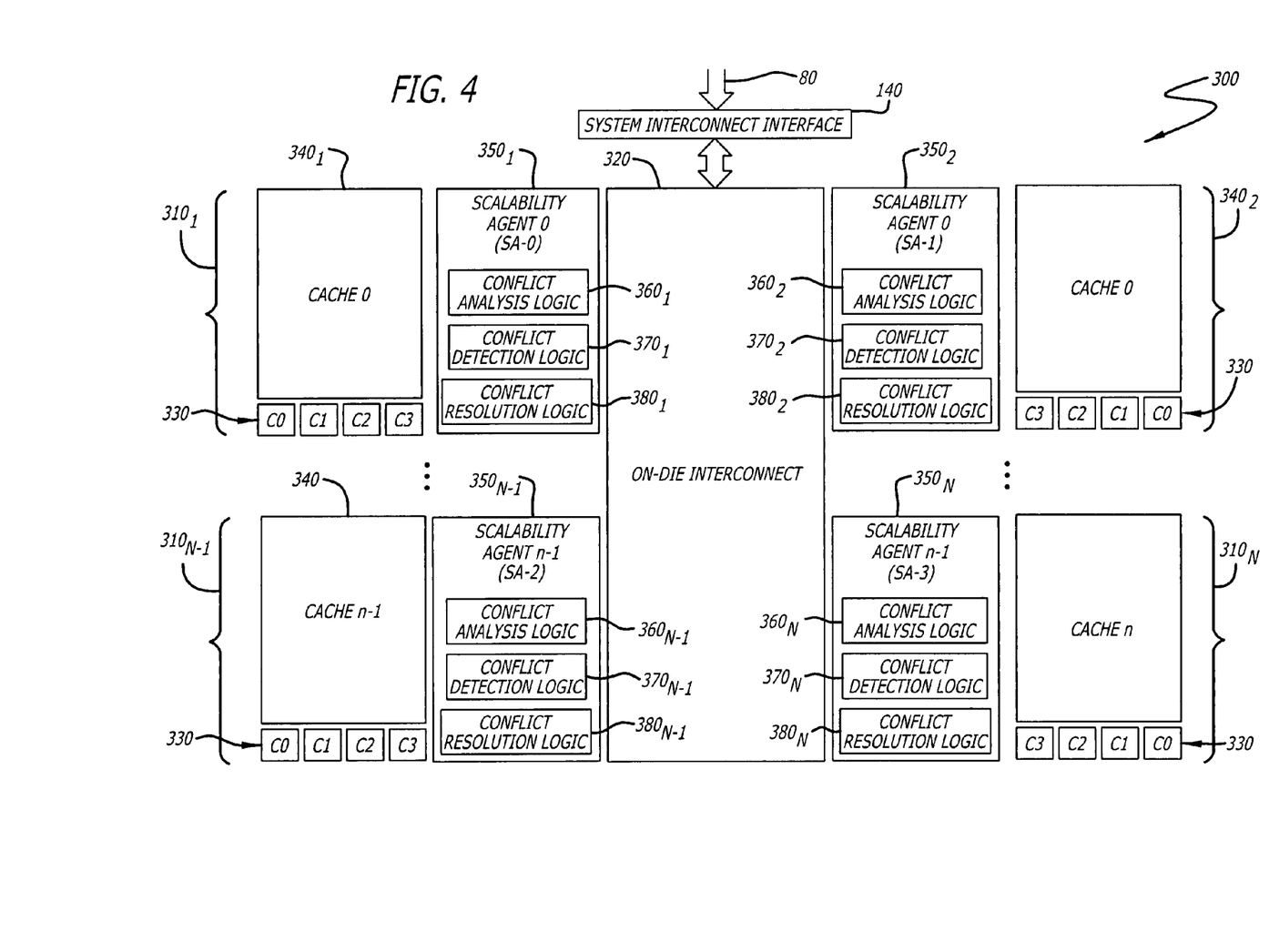
FIG. 4 is an exemplary embodiment of a multi-core processor with a clustered Chip Multi-Processors (CMP) having a scalability agent operating in accordance with an embodiment of the invention.

Referring now to FIG. 4, an exemplary embodiment of a multi-core processor 300 such as a clustered Chip Multi-Processor (CMP) having a scalability agent is shown. Multi-core processor 300 comprises a plurality of core-cache clusters $310_1$-$310_N$ in communication with each other over an on-die interconnect 320. Multi-core processor 300 is in communication with externally located devices over a system interconnect interface 140. According to one embodiment of the invention, on-die interconnect 320 is configured as a ring interconnect, but may be configured as an interconnect mesh (e.g., 2D mesh).

Each core-cache cluster $310_1$, . . . , or $310_N$ include one or more cores 330 that share a cache 340. The architecture of core-cache clusters $310_1$, . . . , or $310_N$ may be in accordance with a caching bridge architecture of FIG. 1 or a distributed shared cache architecture of FIG. 2. The transactions involving core-cache clusters $310_1$-$310_N$ are controlled by a scalability agent 350 as described below.

According to this architecture, multi-core processor 300 enables the latency of a first shared cache (Cache 0) 340 to remain substantially constant despite increases in the number of cores in processor 300. This ensures that the scalar performance of threads with no or limited sharing remains constant.

In addition, multi-core processor 300 comprises one or more core-cache clusters $310_1$, . . . , and/or $310_N$ that can be aggregated to increase its overall performance and support next generation processor designs. For example, if the core-cache cluster is using the caching bridge style architecture, better performance may be realized by aggregating two (4-core) core-cache clusters in order to produce an eight core (8 core) multi-core processor. Also, for instance, two 4-core clusters can be used to build an 8-core processor in one generation, a 12-core processor in the next generation and 16-core processor in a subsequent generation products. The appropriate number "N" of core-cache clusters $310_1$-$310_N$ and the number of cores in each core-cache cluster may be determined to achieve optimum performance. This offers flexibility and the option to choose a simpler implementation.

As further shown in FIG. 4, according to one embodiment of the invention, scalability agent (SA) 350 may be distributed so that scalability agent (SA) units $350_1$-$350_4$ (N=4) uniquely correspond to core-cache clusters $310_1$-$310_4$. More specifically, in order to create a scalable solution, SA 350 can be address partitioned into independent SA units $350_1$, . . . , or $350_4$ each of which is responsible for a subset of address space. For example, if SA 350 is partitioned into four address spaces, each partition supported by one SA unit identified the four SA units are denoted SA-0, SA-1, SA-2 and SA-3 respectively. FIG. 4 shows the case where four core-cache clusters (each with four cores) are aggregated using four SA units $350_1$-$350_4$.

In summary, as shown in FIGS. 1-4, this scalability agent architecture enables a clustered method of scaling the number of cores in a processor. In the clustered scaling option, a core-cache cluster is used as building block and multiple clusters are joined to increase the number of cores in the processor. The core-cache cluster can contain two or more cores with an appropriately sizes shared cache. Note that the core-cache cluster itself can be based on the either caching bridge of FIG. 2 or distributed shared cache architecture of FIG. 3.

II. Conflict Detection and Resolution Scheme

Based on this configuration, SA 350 is adapted to support a protocol, referred to as the scalability agent (SA) protocol, for aggregating core-cache clusters but the aggregation appearing as a single caching agent to devices communicatively coupled to a system interconnect. As shown in FIG. 4, SA 350 is address partitioned and implemented as SA units $350_1$-$350_N$, where each SA unit handles its own address space. Hence, each core-cache cluster $310_1$, . . . or $310_N$ issues all of its outgoing transactions to any of the corresponding SA unit $350_1$, . . . or $350_N$ based on the transaction address. The particular SA unit $350_1$, . . . or $350_N$ performs a conflict check and issues the transactions to system interconnect 140 as well as other core-cache clusters using on-die interconnect 320.

True address conflicts are relatively rare in a multi-core processor. However, such conflict will significantly increase with design complexity. This imbalance between performance return and design complexity is the motivation for reducing the complexity of conflict detection and resolution. According to one embodiment of the invention, a centralized conflict detection is proposed where conflict resolution is mostly performed according to a uniform technique (e.g., agnostic to the actual conflict type and time alignments). This differs from conventional resolution solutions which provide several conflict detection points and conflict resolution flows that are specifically tailored to each conflict type (and even time alignment).

According to one embodiment of the invention, the conflict detection and resolution scheme may be performed by three logic units implemented within each SA unit $350_1$-$350_N$ of FIG. 4. These logic units include conflict analysis logic (CAL) 360, conflict detection logic (CDL) 370, and conflict resolution logic (CRL) 380. These logic units may be situated as a single logic unit or independent logic units as shown.

A. Conflict Analysis

Conflict analysis involves the analysis of different conflict types and potential time windows. Herein, the scalability agent (SA) receives all coherent outgoing transactions and incoming transactions. Due to this visibility to all coherent transactions, SA is an ideal component for performing conflict detection. Each SA unit that collectively form SA includes a conflict analysis logic unit 360 of FIG. 4 to detect a conflict between incoming transactions.

Herein, coherent transactions encountered by SA can be classified broadly into three classes. The first class is referred to as the "Read Class" (RdClass), which includes RdCode (Read Code), RdData (Read Data), RdInvlOwn (Read Invalidate-to-Own) and RdInvlItoE (Read Invalidate I-to-E state) transactions. These transactions are snoopable, but do not involve a data phase from the requesting core-cache cluster.

The "RdCode" transaction is a read transaction when data is retrieved without any intention of modifying the data. The "RdData" transaction is a read transaction where the data is in an Exclusive (E) or Shared (S) state. The data can be modified when in E-state. The "RdInvlOwn" transaction is similar to RdCode except that the data is in E-state and there is an intention to modify the data. The "RdInvlItoE" transaction involves a state change of the data from an Invalid (I) state to E-state.

The second class of coherent transactions is referred to as a "Writeback Class" (WbClass), which includes WbMtoI (Writeback M-to-I state) and WbMtoE (Writeback M-to-E state) transactions. The "WbMtoI" transaction is issued when evicting a line from cache and writing the cache line back to the memory controller. The "WbMtoE" transaction involves placement of data in E-state. These transactions are not snoopable, namely these transactions do not cause on-die snooping actions by any SA unit nor do they cause an incoming snoop to other sockets for propagation over a CSI interconnect. However, these transactions involve a data phase from the requesting core-cache cluster to the memory agent.

The third class of coherent transactions is referred to as the "Snoop Class" (or SnpClass), which includes the incoming transaction versions for RdClass such as Snoop Code (SnpCode), Snoop Data (SnpData), Snoop Invalidate-to-Own (SnpInvlOwn) and Snoop Invalidate I-to-E State (SnpInvlItoE). These snoop transactions correspond to the Read transactions, but the caches are initiating these transactions.

Figure 5:
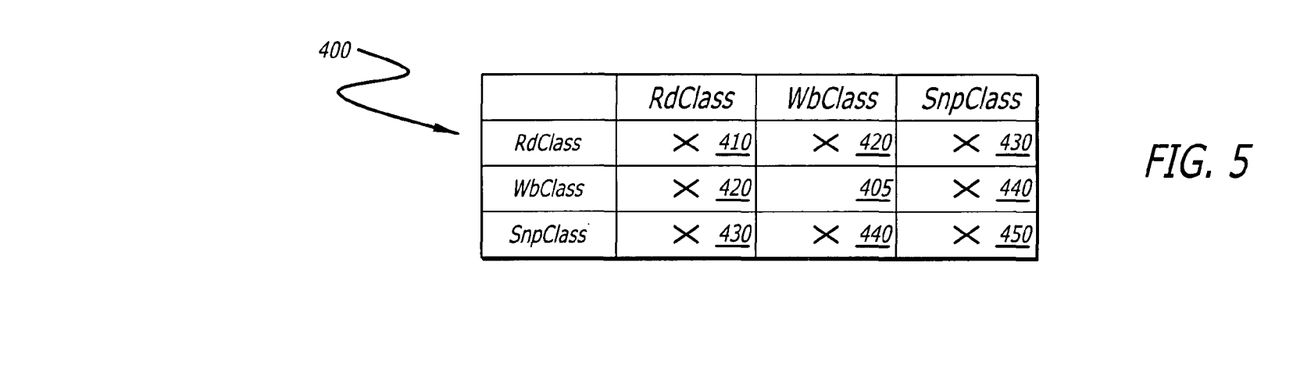
FIG. 5 is an exemplary table illustrates possible conflicts between different instruction classes.

As shown in FIG. 5, a table 400 illustrates the possible conflicts between the different classes mentioned above. As illustrated, there is no potential conflict between two WbClass transactions as represented in box 405. The reason that this type of conflict does not occur is that WbClass transactions can only be issued by the owner of a line and there can only be one owner to a cache line.

Since table 400 is symmetric, we can conclude that there are five distinct conflict types: (1) a Rd-Rd conflict 410, (2) a Rd-Wb conflict 420; (3) a Rd-Snp conflict 430; (4) a Wb-Snp conflict 440; and a Snp-Snp conflict 450. For conflicts between different classes, there are two conflict resolutions depending on the timing (and order of allocation) for each of the conflicting transactions.

Figure 6:
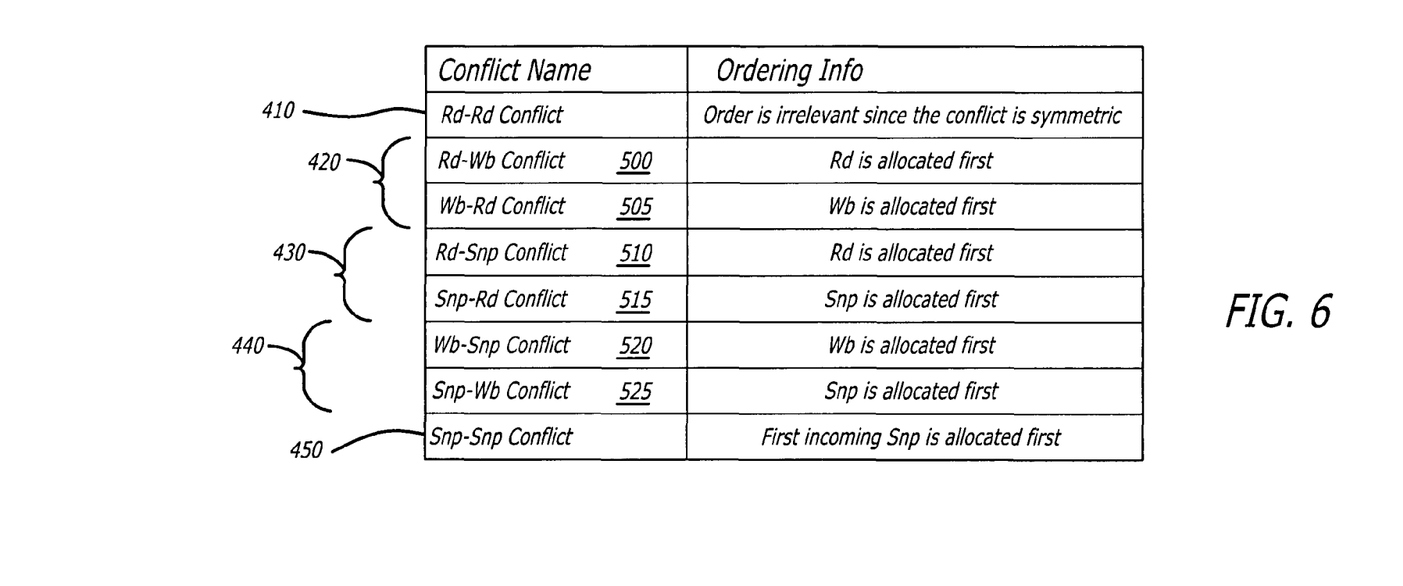
FIG. 6 is an exemplary table illustrating ordering of the possible address conflicts illustrated in FIG. 5.

For instance, as shown in FIG. 6, Rd-Wb conflict 420 requires detection of an Rd-Wb conflict 500 (where the read "Rd" is allocated first) and a Wb-Rd conflict 505 (where the writeback "Wb" is allocated first). Similarly, Rd-Snp conflict 430 requires detection of an Rd-Snp conflict 510 (where "Rd" is allocated first) and a Snp-Rd conflict 505 (where the snoop "Snp" is allocated first). Also, Wb-Snp conflict 440 requires detection of a Wb-Snp conflict 520 (where "Wb" is allocated first) and a Snp-Wb conflict 525 (where "Snp" is allocated first).

Since a single conflict detection point is used, the conflict analysis logic unit of each SA unit can determine a winner of a transaction conflict based on the order of allocation into that SA unit. Hence, there are a total of 8 unique address conflict scenarios based on conflict type and time alignment that need to be resolved. Since 2-way conflicts are detected at one centralized allocation point, any 3-way or higher way conflicts can be broken into a sequence of 2-way conflicts.

B. Conflict Detection

Referring back to FIG. 4, according to one embodiment of the invention, conflict detection may be accomplished by conflict detection logic units $370_1$-$370_N$ implemented within each SA unit $350_1$-$350_N$, respectively. Each conflict detection logic unit $370_1$, . . . , or $370_N$ is adapted to perform content address matching operations by comparing addresses of outstanding transactions with an address of a newly received transaction (sometimes referred to as "content address matching" or "CAM").

Since allocation order can be used to resolve all conflicts, a previously allocated entry will match the later allocated entry at the time of later entries allocation. Once the address conflict is detected, the newly received and allocated transaction is marked to indicate that it has seen a conflict. Thereafter, conflict resolution logic unit $380_1, \ldots,$ or $380_N$ will take appropriate action based on conflict type.

C. Conflict Resolution

Herein, conflict resolution logic units $380_1$-$380_N$ handle and resolve conflicts between incoming transactions. In general, conflict resolution involves, after a conflict address matching operation is conducted and an address conflict is determined, an analysis is conducted to determine the incoming transaction and what transactions it matched within conflict detection logic $370_i$ of FIG. 4. Based on the ordering of the transactions and the results of this determination, certain actions are performed to resolve the conflict.

The following general rules apply to SA conflict resolution:

1) SA conflict resolution may be non-blocking for all conflict cases. In other words, once a conflict is detected, the conflicting transaction(s) is (are) allowed to flow through SA's instruction pipeline and eventually deallocate. The lack of any block or unblock conditions within the conflict resolution scheme simplifies conflict resolution.

2) The allocation order of transactions into SA determines which transaction prevails in the event of a conflict, independent of the conflict type or time alignments. Hence, earlier transactions are unaffected by the detection of a conflict for a later transaction.

3) SA performs CAM operations on new transactions in order to detect if there are any conflicts. Hence, conflict detection is directed only to newly allocating transactions.

4) Any action taken to resolve a conflict is independent of the number of conflicting transactions which are already allocated into SA unit.

5) Requesting core-cache cluster will receive a "Reject" transaction. Accept and Reject transactions are between the SA unit and the core-cache cluster.

6) As a special condition, all incoming transactions which detect a conflict will be issued to the core-cache clusters with an indication that the snoop is ordered behind some previous outgoing transaction. The ordering indication and the reception of the snoop transaction will assist the core-cache cluster in resolving the conflict.

Referring now to FIGS. 7-14, exemplary signal flows for detecting and resolving each of the eight (8) conflict types by logic within the SA is shown. For these illustrative example, the flows are demonstrated with two core cache clusters (CC0 & CC1) and two SA units in socket. Of course, other architectures may be provided, and as a result, such signaling may vary slightly.

A. Rd-Rd Conflict

Figure 7:
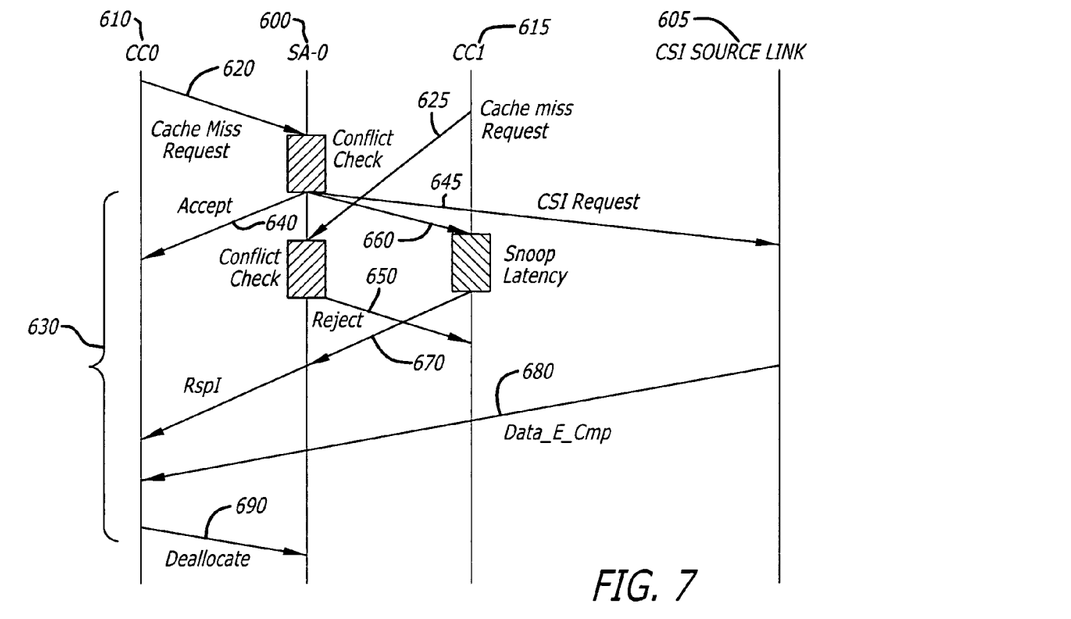
FIG. 7 is an illustrative embodiment of signal flows for detecting and resolving an exemplary address conflict between two Read (Rd) transactions.

As shown in FIG. 7, for this embodiment of the invention, a scalability agent "SA" unit (SA-0) 600 receives two Read request messages (Cache Miss requests) 620 and 625 to the same address. Read request messages 620 and 625 are from a first core-cache cluster (CC0) 610 and a second core-cache cluster (CC1) 615, respectively. A conflict window 630 for first Read request message 620 is from the time an "Accept" message 640 is sent from SA-0 600 in response to first Read request message 620 to the time that a Deallocate message 690 is received from CC0 610.

SA-0 600 receives first Read request message 620 from CC0 610 and its conflict detection logic unit performs a conflict check operation on the address associated with first Read request message 620. Upon determining that there is no conflict, SA-0 600 issues Accept message 640 to CC0 600 and issues a CSI broadcast 645 to all other devices receiving communications over the CSI interconnect such as other multi-core processors (hereinafter referred to as the "CSI Link" 605). In addition, SA-0 600 issues a Snoop message 660 to CC1 615 in order to identifying another Read (e.g., Cache Miss) request message for the address has been accepted.

Previously, for this Rd-Rd conflict, CC1 615 issues a second Read request message 625, which is directed to the same address as first Read request message 610. SA-0 600 receives second Read request message 625 from CC1 615 and its conflict detection logic unit performs a conflict check operation on the address associated with second Read request message 625. During the conflict check, a conflict is detected with a previous read (first Read request 620). As a result, SA-0 issues a Reject message 650 to CC1 615 and CC1 615 may retry its read after some time has elapsed.

From the viewpoint of CC0 610 or CC1 615, during the period that it issues a Read request and receives either an Accept or Reject message, the Read transaction is in null phase (nothing has been issued to the system "CSI" interconnect). Hence, any incoming transactions which conflict with its outstanding transaction will be treated as a miss. Hence, since CC1 615 received a conflicting snoop (Snoop message 660) before receiving Reject message 650, CC1 615 was provided with information that it will likely receive a Reject message.

In response to Snoop message 660, CC1 615 transmits a Response Invalid (RspI) message 670. The RspI message is used to indicate that CC1 does not own the requested cache line. SA-0 600 will receive RspI message 670 from CC1 615 and will forward RspI message 670 to CC0 610. At some time, CC0 610 will receive a Complete (Data_E_Cmp) message 680 from the CSI home agent (not shown) to signal that the fetched data (e.g., cache line) can be placed in E-state. Thereafter, CC0 610 issues a global observation (G.O) to the requesting core-cache cluster (CC0 610) at this point. The "G.O" indicates that the corresponding request has been observed globally and responses are complete. Once the CSI transaction is complete, CC0 610 will issue a Deallocate message 690 to SA-0 600 to deallocate a "tracker entry" in SA-0 600, namely dedicated storage that was assigned to store information associated with first Read request 620.

B. Rd-Wb Conflict

Figure 8:
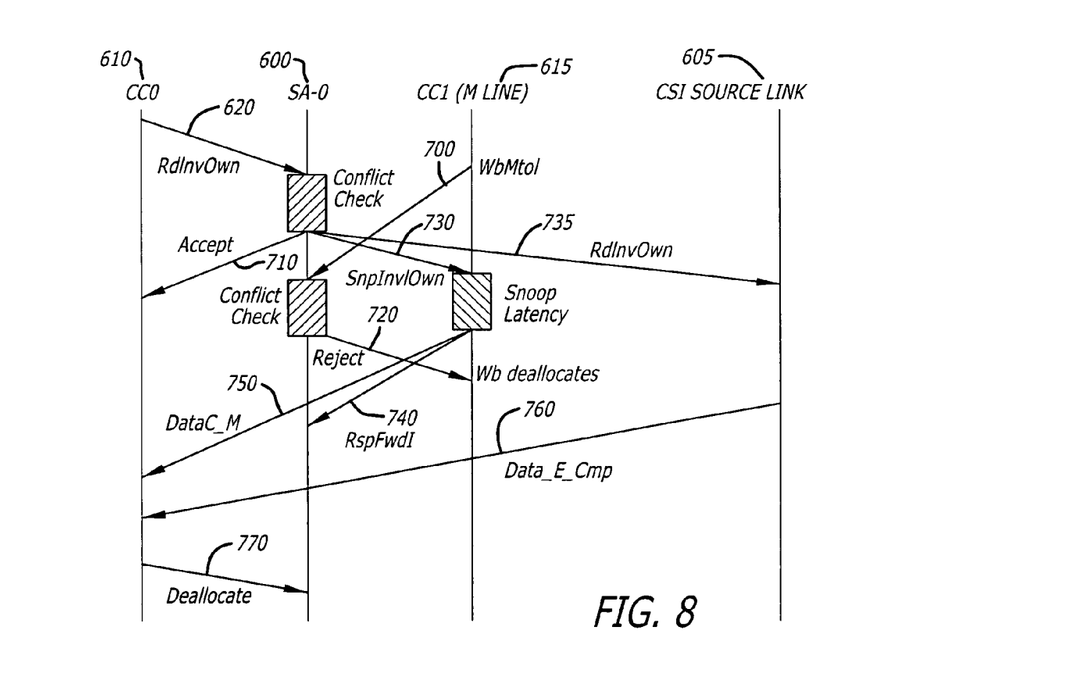
FIG. 8 is an illustrative embodiment of signal flows for detecting and resolving an exemplary address conflict between a Read (Rd) transaction and a Writeback (Wb) transaction.

Referring now to FIG. 8, for this embodiment of the invention, Read request message 705 from CC0 610 enters SA-0 600 before a Writeback (Wb) request message 700 from CC1 615. As shown, Read Request message 705 initiates a RdInvOwn transaction that expects to receive data in an E-state or M-state. Herein, CC1 615 has the requested cache line in M-state. Wb request message 700 is a WbMtoI transaction for changing a stored state of the requested cache line from M-state to I-state.

Since Read request message 705 from CC0 610 was allocated before Wb request message 700, CC0 610 receives an Accept message 710 from SA-0 600 while CC1 615 will subsequently receive Reject message 720. However, upon SA-0 600 issuing Accept message 710, SA-0 600 also issues an on-die Snoop (SnpInvOwn) request message 730 as shown. Snoop request message 730 can arrive any time before Reject message 720 in response to receipt of Wb request message 700 directed to the same address as Read request message 705. Reject message 720 causes deallocation of the writeback because the modified data has already been allocated to CC0 610. Similarly, Read request message 705 is provided as a CSI broadcast 735 to other core-cache clusters outside the CMP represented by CSI link 605.

Since Wb is in "CSI null" phase, CC1 615 completes snooping of its caches and respond without indicating any conflict. CC1 615 may indicate a "HitM" response by sending Response Forward Invalidate (RspFwdI) message 740 to SA-0 600 to identify that the cache line will be forwarded and sending a DataC_M message 750 (assuming that Read request message 705 is RdInvlOwn) directly to CC0 610. On observing a forward response from CC1 615, SA-0 600 determines that it does not need to send any response to CC0 610. Eventually, CSI home agent will send a Complete (Data_E_Cmp) message to CC0 610. CC0 610 can issue a global observation to the requesting core when it receives DataC_M message 750. Since Wb transaction from CC1 615 is snooped before the transaction can enter its "CSI Request" phase, the Wb transaction can be de-allocated, via the Reject message 720 received from SA-0. Eventually, the winning read transaction in SA-0 is de-allocated by a Deallocate message 770 from CC0 610.

C. Rd-Snp Conflict

Figure 9:
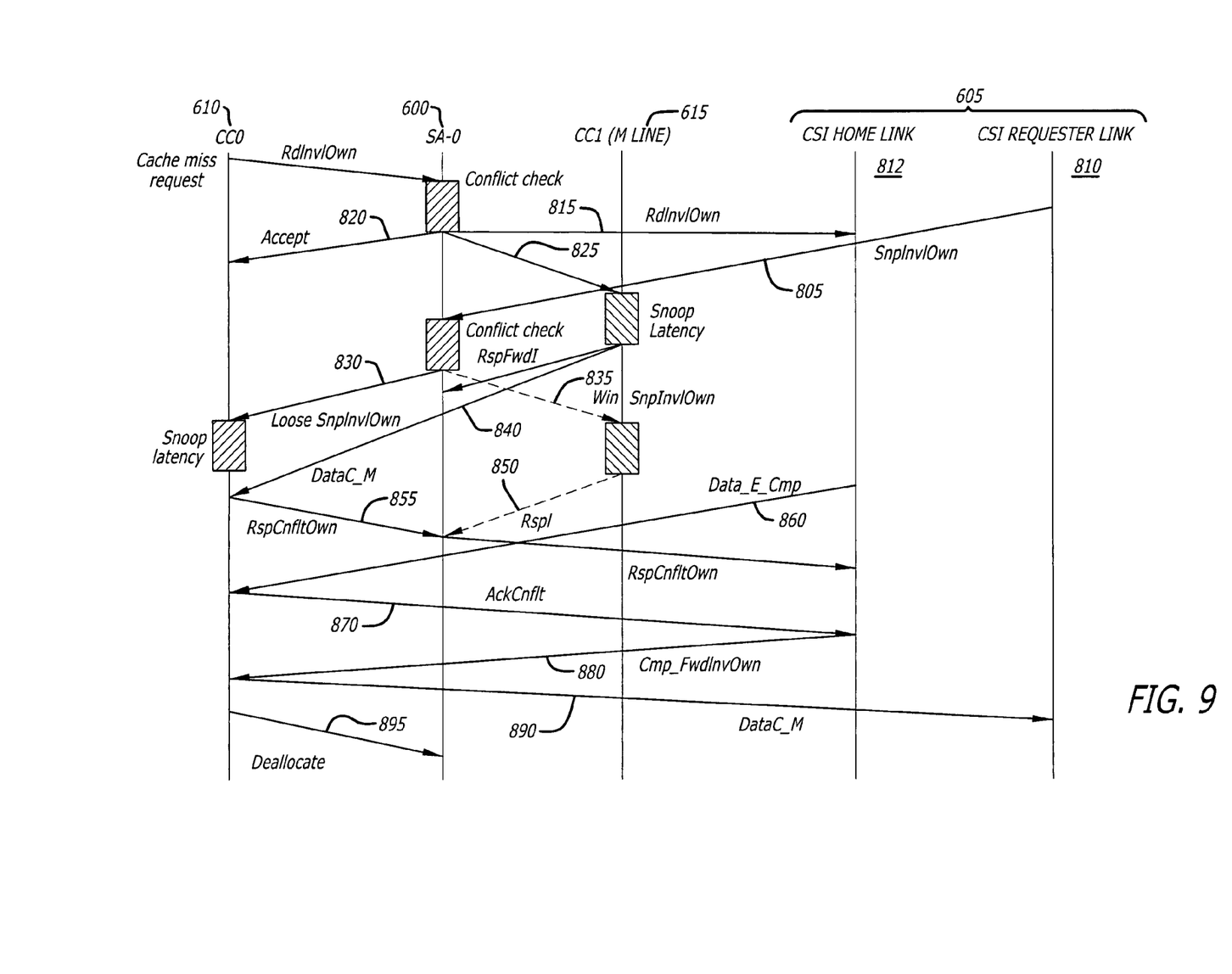
FIG. 9 is an illustrative embodiment of signal flows for detecting and resolving an exemplary address conflict between a Read (Rd) transaction and a Snoop (Snp) transaction.

Referring now to FIG. 9, a conflict between an outgoing read transaction and an incoming snoop transaction is shown. A Read transaction is initiated by CC0 610 and a RdInvlOwn message 800 is transmitted from CC0 610 to SA-0 600. Since SA-0 600 has not detected any conflicts upon receipt of RdInvlOwn message 800, SA-0 600 will issue an Accept message 820 and will also initiate a CSI broadcast 815 of the RdInvlOwn message to CSI link 605 onto the CSI interconnect to a home agent coupled to the CSI interconnect (referred to as the "CSI Home Link" 812). This transmission occurs before receipt of a Snoop (SnpInvlOwn) message 805 from an off-die device referred to as a "CSI Requester Link" 810).

Thereafter, a Snoop (SnpInvlOwn) message 805 to the same address is provided into SA-0 600. During the conflict check phase, SA-0 600 detects an address conflict between outgoing Read transaction (RdInvOwn) and incoming snoop transaction (SnpInvOwn).

SA-0 600 decides the order in which snoops are issued. The "losing snoop," namely the snoop request that did not win the conflict, is provided with a Loose Snoop Invalidate-to-Own (Loose SnpInvlOwn) message 830. Loose SnpInvlOwn message 830 indicates that CC0 610 is to hold the snoop until it knows the state of the cache line. In other words, CC0 610 holds Loose SnpInvlOwn message 830 until it receives DataC_M message 840 or some other form of a response (e.g., RspI message). Based on the receipt of DataC_M message 840, where the requested cache data is provided in modified state to CC0 610, CC0 610 generates a RspCnfltOwn message 855 to SA-0 600.

Similarly, the "wining snoop" is provided with a Win Snoop Invalidate-to-Own (Win SnpInvlOwn) message 835. Win SnpInvlOwn message 835 allows the snoop to complete through transmission of a Response Invalidate (RspI) message 850 routed to SA-0 600.

As a result, SA-0 600 receives both RspCnfltOwn message 855 and RspI message 850, which causes SA-0 600 to route RspCnfltOwn message 855 to CSI Home Link 812 to respond that CC0 610 has ownership of the cache line. In the meantime, however, in the event that CSI Home Link 812 responds to RdInvlOwn message 800 by CC0 610 with a Data_E_Cmp message 860, CC0 610 sends an Acknowledge Conflict (Ack-Cnflt) message 870 to indicate to the home agent that it may have missed a conflict. Upon notification that the conflict has been observed, CSI Home Link 812 notifies CC0 610 through a Cmp_FwdInvOwn message 880, which causes CC0 610 to forward data to the snoop requesting device (CSI Requester Link 810) via DataC_M message 890. Thereafter, CC0 610 sends a Deallocate message 895 to SA-0 600 in order to deallocate tracker entries associates with the Read transaction.

According still to FIG. 9, the Loose SnpInvlOwn signal 830 indicates to CC0 610 that it can block a response to this second snoop temporarily until it receives an on-die response for Read transaction 800. Since the on-die response can be a "Hit Modify" (HITM) signal, CC0 610 needs to wait for this response before it can respond with appropriate conflicting responses (either RspCnflt or RspCnfltOwn).

As shown, upon receiving Loose SnpInvlOwn message 830, CC0 610 will block the Snoop operation until it receives a forward response from CC1 615 (DataC_M 840). Since CC0 610 knows at this stage that it has received a buried HITM signal, it will provide RspCnfltOwn message 855 to SA-0 600, where SA-0 will issue another RspCnfltOwn message to CSI Home Link 812 being the home agent in communication over the CSI interconnect.

D. Wb-Rd Conflict

Figure 10:
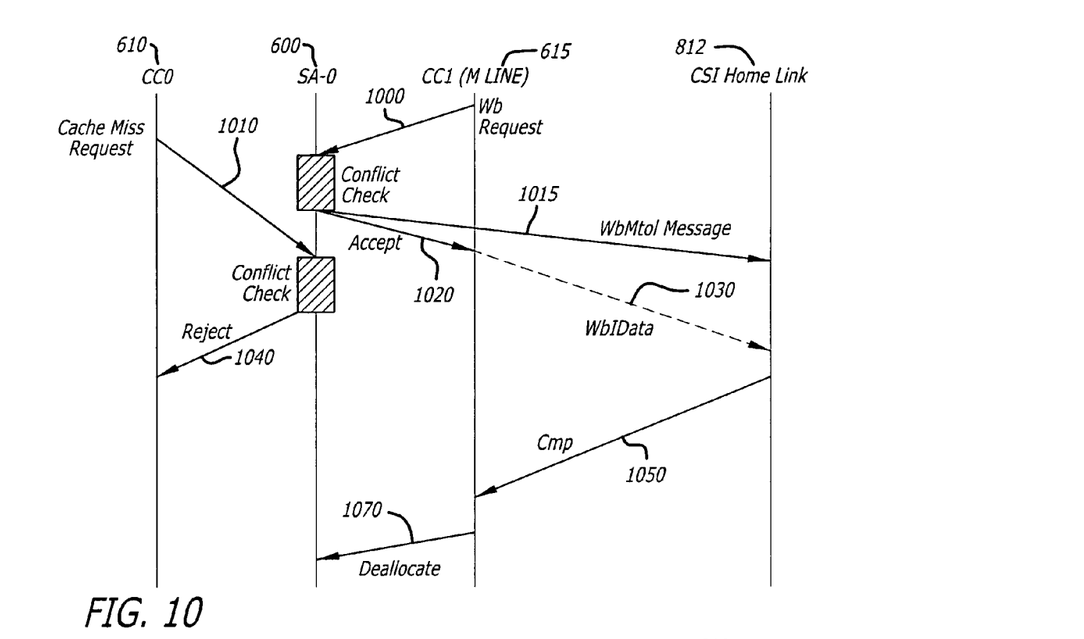
FIG. 10 is an illustrative embodiment of signal flows for detecting and resolving an exemplary address conflict between a Writeback (Wb) transaction and a Read (Rd) transaction.

Referring now to FIG. 10, a conflict caused by a Writeback (Wb) request 1000 entering the SA-0 600 before a Read (Rd) request 1010 from another core-cache cluster (CC0 610) is shown. Herein, Wb request 1000 from CC1 615 is allocated prior to Rd request 1010. Therefore, SA-0 600 provides an Accept message 1020 to CC1 615 along with a WbMtoI message 1015 to evict the cache line and writing the cache line back to the memory controller. In response to receipt of Accept message 1020, CC1 615 will send a data message (WbIData) 1030 to CSI Home Link 812.

CC0 610 will receive a Reject message 1040 for its RD request 1010 and must retry Rd request 1010 after a certain time period has elapsed. Since Reject message 1040 is applicable to Rd request 1010, SA-0 600 will not issue any snoops to CC0 610 and CC1 615 until it can complete its Wb flow without any interference from conflicting read transactions. Thereafter, CC1 615 will receive a Complete (Cmp) message 1050 for its Wb transaction from a CSI Home Link 812 and will, in turn, send a Deallocate message 1070 to SA-0 600. On receiving Deallocate message 1070, SA-0 600 will deallocate tracker entries for Wb request 1000. The retried read from CC0 can now progress.

E. Wb-Snp Conflict

Figure 11:
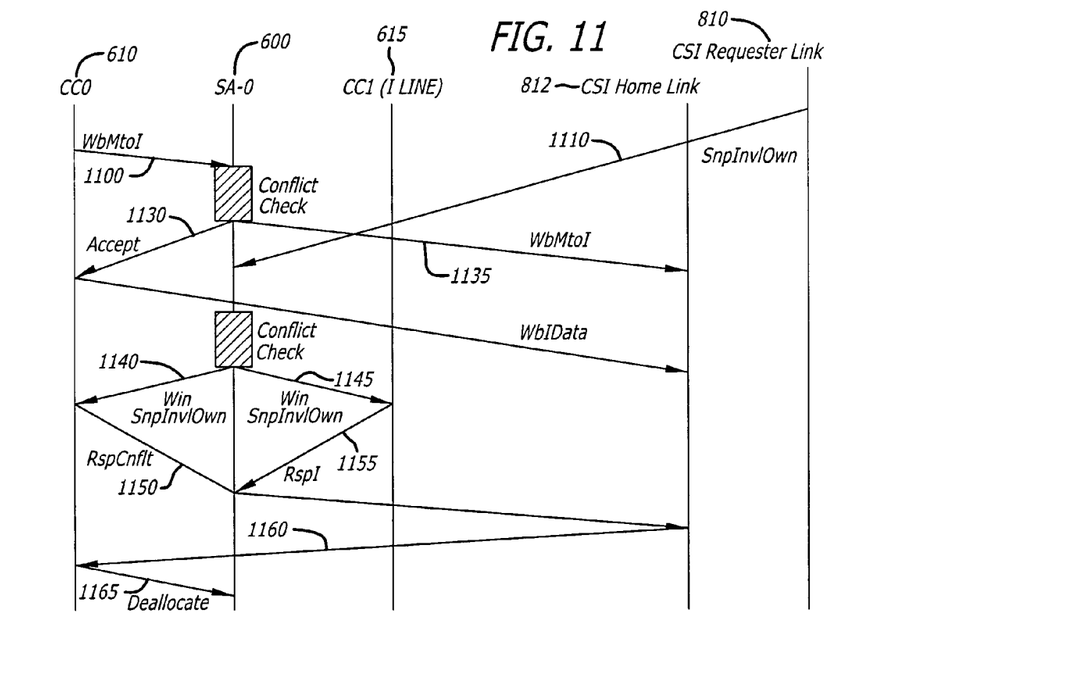
FIG. 11 is an illustrative embodiment of signal flows for detecting and resolving an exemplary address conflict between a Writeback (Wb) transaction and a Snoop (Snp) transaction.

Referring to FIG. 11, a Writeback (WbMtoI) message 1100 from CC0 610 is shown where Wb message 1100 arrives at SA-0 600 before a Snoop transaction 1110 to the same address from a device on the CSI interconnect (CSI Requester link 810). CC0 610 will receive an Accept message 1130 and will enter a request phase for the Writeback transaction. Moreover, SA-0 600 will issue a WbMtoI message 1135 to the home agent on the CSI interconnect (CSI Home Link 812).

On receiving the conflicting snoop from CSI Requester link 1120, SA-0 600 will make this snoop as a "losing snoop" (Loose SnpInvlOwn) and send snoop messages to both CC0 610 and CC1 615 as "Loose SnpInvlOwn" and "Win SnpInvlOwn" messages 1140 and 1145 as described above. CC0 610, on receiving Loose SnpInvlOwn message 1140, will respond with a "RspCnflt" message 1150 and CC1 will respond with a "RspI" message 1155 similar to the operations set forth in FIG. 9. SA-0 600 will combine both these responses and send a "RspCnflt" message to the home agent. Snoop tracker entries can now be deallocated in SA-0 600.

Some time later, CC0 610 will receive a signal that the Writeback transaction has been completed via a Cmp message 1160. Upon receipt, CC0 610 will send a Deallocate message 1165 to SA-0 600 and SA-0 600, in turn, will deallocate the tracker entries for the Writeback transaction.

F. Snp-Rd Conflict

Figure 12:
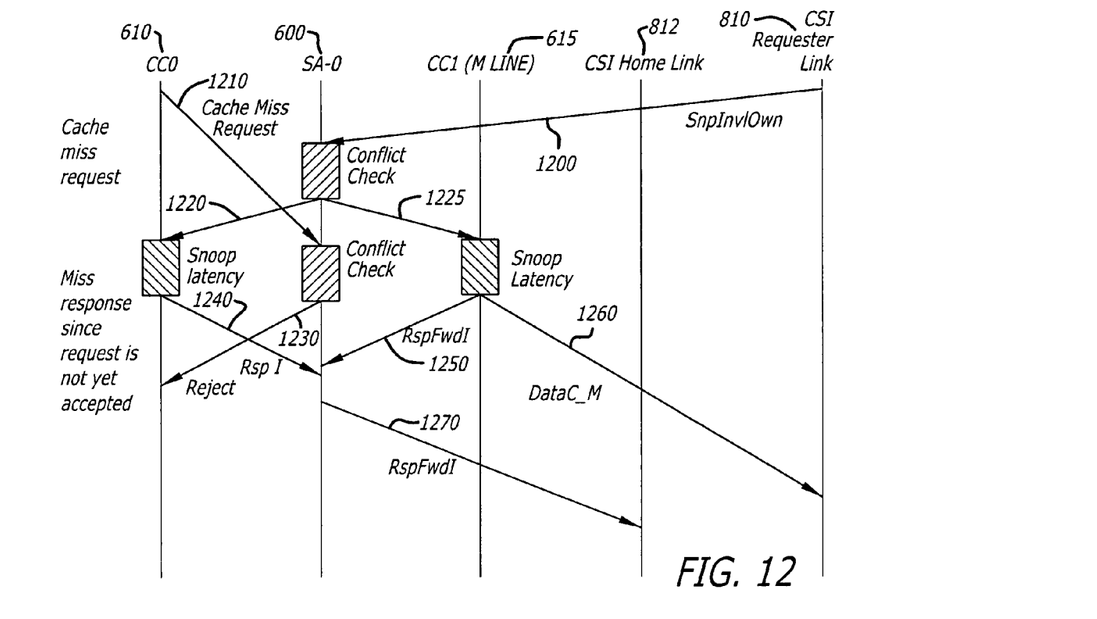
FIG. 12 is an illustrative embodiment of signal flows for detecting and resolving an exemplary address conflict between a Snoop (Snp) transaction and a Read (Rd) transaction.

Referring now to FIG. 12, conflict resolution between a snoop and read transaction, where a Snoop (SnpInvlOwn) request 1200 from the CSI Requester link 1205 is initially provided into SA-0 600, is shown. Upon detecting no conflict, SA-0 600 routes a "Win SnpInvlOwn" messages 1220 and 1225 to CC0 610 and CC1 615, respectively.

A Read request message 1210 coming from CC0 610 finds the snoop messages 1220 and 1225 already issued, and thus, CC0 610 receives a Reject message 1230 from SA-0 600. CC0 610 may receive a snoop (Win SnpInvlOwn message 1220) from SA-0 600 before it receives Reject message 1230. CC0 610 will respond with a Response Invalid (RspI) message 1240. In this case, since CC1 615 contains the cache line in M-state, it will respond with RspFwdI message 1250 and send the data 1260 directly to the requester via the DataC_M message 1260. SA-0 600 will combine the snoop responses and send a RspFwdI message 1270 to CSI home link 812.

G. Snp-Wb Conflict

Figure 13:
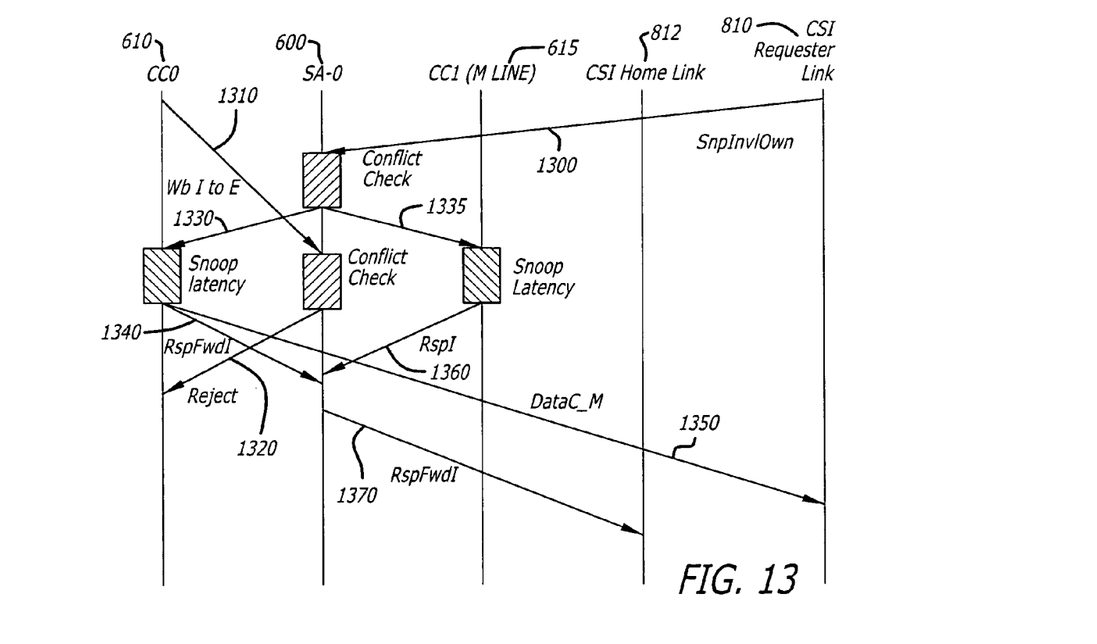
FIG. 13 is an illustrative embodiment of signal flows for detecting and resolving an exemplary address conflict between a Snoop (Snp) transaction and a Writeback (Wb) transaction.

Referring to FIG. 13, a snoop (SnpInvlOwn) message 1300 from a CSI Requester link 810 arrives at SA-0 600 before a writeback (WbItoE) request message 1310 from CC0 610. Wb request message 1310 from CC0 610 is rejected and CC0 610 receives a Reject message 1320 from SA-0 600.

However, upon receipt of SnpInvlOwn message 1300 and detection of no conflict, SA-0 600 routes on-die snoop messages, referred to as "Win SnpInvlOwn" message 1330 and "Win SnpInvlOwn" message 1335, to CC0 610 and CC1 615, respectively.

Since CC0 610 contains the requested cache line in M-state, it will issue an RspFwdI response message 1340 to SA-0 600 and send the requested data to a requesting processor core (CSI Request link) over DataC_M message 1350. CC1 615 will respond to Win SnpInvlOwn message 1335 with a RspI message 1360. SA-0 600 will combine both the snoop responses 1340 and 1360 and send an RspFwdI message 1370 to CSI Home Link 812 for this transaction. The snoop tracker entries can now be deallocated in SA-0 600. Since the Wb entry is snooped out in its "CSI null" phase, CC0 610 will deallocate the Wb transaction also.

H. Snp-Snp Conflict

Figure 14:
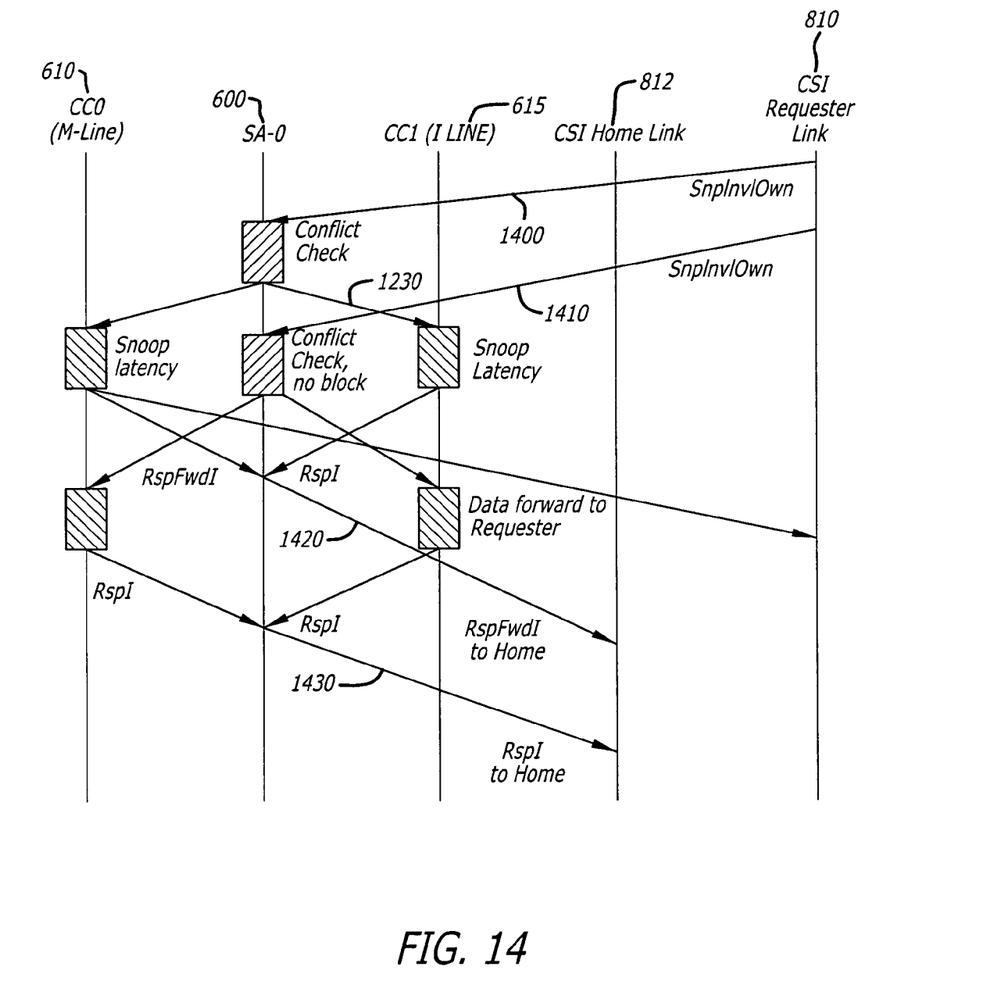
FIG. 14 is an illustrative embodiment of signal flows for detecting and resolving an exemplary address conflict between two Snoop (Snp) transactions.

Referring to FIG. 14, for this conflict, two snoop messages 1400 and 1410 to the same address are received by SA-0 600. The current conflict resolution for this conflict is for SA-0 600 to take no actions. Snoops are issued to core-cache clusters in the same order that they are received, and snoop responses are collected and combined snoop responses are issued to CSI Home Link 812 via RspFwdI message 1420 and RspI message 1430.

As a result, this invention presents an important invention in the area of large scale CMP. The scalable core-cache cluster aggregation architecture can be used to processors with larger and larger number of cores by aggregating core-cache clusters. Scalability agent provides conflict detection and resolution logic that provides uniform resolution across different types of conflicts. This reduction in complexity enables an increase in core-cache clusters without experiencing greater complexity.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A semiconductor chip, comprising:
   a first core cache cluster having a first plurality of processor cores, a first portion of a shared cache associated with said first plurality of processor cores, and,
   a first scalability agent associated with said first portion of said shared cache;
   a second core cache cluster having a second plurality of different processor cores, a second portion of said shared cache associated with said second plurality of processor cores, and, a second scalability agent associated with said second portion of said shared cache;
   interconnect circuitry interconnecting said first and second core cache clusters;
   said first and second portions of said shared cache assigned different respective address spaces of said shared cache and where no portion of said shared cache on said semiconductor chip has overlapping address space with another portion of said shared cache on said semiconductor chip; and,
   said first and second scalability agents each having respective conflict detection, analysis and resolution logic to detect, analyze and resolve respective conflicts of caching transactions directed to its respective address space.

2. The semiconductor chip of claim 1 wherein said interconnect circuitry further comprises a ring architecture.

3. The semiconductor chip of claim 1 wherein said interconnect circuitry further comprises a mesh architecture.

4. The semiconductor chip of claim 1 wherein said conflict detection, analysis and resolution logic of said first and second scalability agents each have respective content addressable memory (CAM) circuits to detect conflicts.

5. The semiconductor chip of claim 1 wherein said caching transactions include different classes of caching transactions including read, writeback and snoop.

6. The semiconductor chip of claim 1 wherein said semiconductor chip includes a system interconnect interface.

7. A computing system, comprising:
   a mouse; and
   a semiconductor chip comprising:
      a first core cache cluster having a first plurality of processor cores, a first portion of a shared cache associated with said first plurality of processor cores, and, a first scalability agent associated with said first portion of said shared cache;
      a second core cache cluster having a second plurality of different processor cores, a second portion of said shared cache associated with said second plurality of processor cores, and, a second scalability agent associated with said second portion of said shared cache;
      interconnect circuitry interconnecting said first and second core cache clusters;
      said first and second portions of said shared cache assigned different respective address spaces of said shared cache and where no portion of said shared cache on said semiconductor chip has overlapping address space with another portion of said shared cache on said semiconductor chip; and,
      said first and second scalability agents each having respective conflict detection, analysis and resolution logic to detect, analyze and resolve respective conflicts of caching transactions directed to its respective address space.

8. The server computer system of claim 7 wherein said interconnect circuitry further comprises a ring architecture.

9. The server computer system of claim 7 wherein said interconnect circuitry further comprises a mesh architecture.

10. The server computer system of claim 7 wherein said conflict detection, analysis and resolution logic of said first and second scalability agents each have respective content addressable memory (CAM) circuits to detect conflicts.

11. The server computer system of claim 7 wherein said caching transactions include different classes of caching transactions including read, write back and snoop.

12. The server computer system of claim 7 wherein said semiconductor chip includes a system interconnect interface.

* * * * *